United States Patent
Borderi et al.

(10) Patent No.: US 12,338,079 B2
(45) Date of Patent: Jun. 24, 2025

(54) FEEDING GROUP AND METHOD FOR FEEDING A PLURALITY OF ARTICLES IN DISCRETE ROWS

(71) Applicant: G.D S.P.A., Bologna (IT)

(72) Inventors: Luca Borderi, Bologna (IT); Gianluca Parisini, Bologna (IT); Antonio Gigante, Bologna (IT)

(73) Assignee: G.D S.P.A., Bologna (IT)

( * ) Notice: Subject to any disclaimer, the term of this patent is extended or adjusted under 35 U.S.C. 154(b) by 188 days.

(21) Appl. No.: 18/018,845

(22) PCT Filed: Jul. 26, 2021

(86) PCT No.: PCT/IB2021/056726
§ 371 (c)(1),
(2) Date: Jan. 30, 2023

(87) PCT Pub. No.: WO2022/029553
PCT Pub. Date: Feb. 10, 2022

(65) Prior Publication Data
US 2023/0303336 A1    Sep. 28, 2023

(30) Foreign Application Priority Data
Aug. 7, 2020   (IT) .................... 102020000019651

(51) Int. Cl.
*B65G 47/26*   (2006.01)
*B65G 47/248*   (2006.01)
*B65G 65/23*   (2006.01)

(52) U.S. Cl.
CPC .......... *B65G 47/248* (2013.01); *B65G 47/26* (2013.01); *B65G 65/23* (2013.01)

(58) Field of Classification Search
CPC ....... B65G 27/248; B65G 27/26; B65G 65/23
(Continued)

(56) References Cited

U.S. PATENT DOCUMENTS 2,827,151 A   3/1958   Engleson et al.
3,729,085 A *  4/1973   Schlueter ............... B65G 47/24
                                                                198/792
(Continued)

FOREIGN PATENT DOCUMENTS

CN      110589081 A     12/2019
DE      102013202511 A1   8/2014
(Continued)

OTHER PUBLICATIONS

International Search Report and Written Opinion for International PCT Application No. PCT/IB2021/056726 filed on Jul. 26, 2021, on behalf of G.D S.P.A., Mailed on Feb. 23, 2022, 16 Pages.

*Primary Examiner* — Douglas A Hess
(74) *Attorney, Agent, or Firm* — Steinfl + Bruno LLP

(57) ABSTRACT

A feeding group includes a tray to retain articles arranged in discrete rows, an inlet station to receive the tray, a transfer device to move the tray, and a retaining device to retain the tray during movement of the tray between the inlet station and an unloading station. The retaining device is to further release the tray at an outlet station. The feeding group also includes an unloading device to unload the articles from the tray at the unloading station. The unloading station includes a conveyor device to receive the discrete rows unloaded from the tray.

17 Claims, 7 Drawing Sheets

(58) Field of Classification Search
USPC .......................................................... 198/373
See application file for complete search history.

(56) References Cited

U.S. PATENT DOCUMENTS

| | | | | |
|---|---|---|---|---|
| 4,768,641 | A * | 9/1988 | Hibi | ..................... B21D 53/085 |
| | | | | 198/408 |
| 6,217,274 | B1 * | 4/2001 | Svyatsky | ............... B65H 1/025 |
| | | | | 198/408 |
| 6,398,008 | B1 | 6/2002 | Suga | |
| 7,191,892 | B2 * | 3/2007 | Monti | ..................... B65B 5/105 |
| | | | | 198/408 |
| 7,249,670 | B2 * | 7/2007 | Marian | .................. B65G 35/06 |
| | | | | 198/409 |
| 9,021,773 | B2 * | 5/2015 | Ford | ....................... B65B 35/56 |
| | | | | 53/566 |
| 9,376,269 | B2 * | 6/2016 | Rodi | ....................... B65H 9/06 |
| 10,207,880 | B2 | 2/2019 | Krueger et al. | |
| 10,889,440 | B2 * | 1/2021 | Perry-Eaton | ........... B65H 29/02 |
| 12,091,270 | B2 * | 9/2024 | Perry-Eaton | ......... B65G 47/907 |
| 2018/0265232 | A1 | 9/2018 | Kim | |

FOREIGN PATENT DOCUMENTS

| | | |
|---|---|---|
| EP | 3115321 A1 | 1/2017 |
| JP | 2001261161 A | 9/2001 |
| WO | 2017/048129 A2 | 3/2017 |

\* cited by examiner

FEEDING GROUP AND METHOD FOR FEEDING A PLURALITY OF ARTICLES IN DISCRETE ROWS

CROSS REFERENCE TO RELATED APPLICATIONS

The present application is the US National Stage of International Patent Application No. PCT/IB2021/056726, filed on Jul. 26, 2021, which in turn, claims priority to Italian Application No. IT 102020000019651, filed on Aug. 7, 2020.

The present invention relates to a feeding group for feeding a plurality of articles in discrete rows, of a type intended for use in an article packaging machine.

It is further directed to a packaging machine comprising such a feeding group as well as to a method for feeding a plurality of articles in discrete rows.

The present invention finds a preferred, though not exclusive, application in the field of canned packaging of loose articles, such as capsules for infusion products, for example coffee, a field to which reference may be made hereafter without loss of generality.

In particular, in the relevant technical field, packaging machines are known in which the articles to be packaged are fed into a feeding station of the machine and transferred to different article processing areas, in which the articles are, for example, filled with a product intended to be contained within them, sealed, packaged.

In a known embodiment, the articles are fed onto the packaging machine arranged in discrete rows. In this embodiment, the articles are loaded onto a conveyor belt of the packaging machine, which is in charge of moving the articles to the different areas that make up the machine, grouped in rows formed by a discrete number of articles. During the packaging steps, there are provided one or more zones in which the articles grouped in rows are individually separated to carry out one or more of the above operations.

In this description as well as in the accompanying claims, certain terms and expressions are deemed to have, unless otherwise expressly indicated, the meaning expressed in the following definitions.

The term "article" means any solid product which, within an industrial production line, can be picked up, moved and deposited from a feeding group in order to be fed into a packaging machine.

The feeding group can be configured to pick up one or more discrete rows of such articles placed in a tray and deposit it at a conveyor device.

The articles can be identical to each other, or they can differ from each other in some characteristics such as for example the formation, the composition, the colour or their orientation.

The articles can be, for example, food and confectionery products already packed in individual containers or wrappers, such as coffee capsules or other infusion type beverages, bottles and cartons of beverages, yoghurt pots, individual chocolates (wrapped or bare), candies, small boxes, pouches containing solid, liquid or semi-solid food products; moreover, products of the ceramic industry, absorbent products for hygienic use, products of the tobacco industry, products of the cosmetic industry, products of the pharmaceutical industry, products of the personal & home care industry. The term "discrete row" referring to articles means a plurality of single articles grouped in a linear arrangement. Preferably, the articles grouped into discrete rows are stacked in a nested configuration in separate stacks of articles. More generally, the articles can be configured to maintain the alignment, i.e. their linear sorting position, during the movement. Alternatively, the use of additional retaining elements may be envisaged in order to maintain this order.

The term "station" means any zone specifically designated to carry out an operation to feed articles. This zone can be either defined by a specific component of the feeding group or more generally of a processing line, or by a portion of such a component. Each station can also be defined as a zone for performing several operations, unless otherwise specified.

The term "loose" referring to articles means a plurality of single articles which are separated and not constrained to each other, so that each of them can be moved and treated independently of the other articles.

A plurality of articles is moved, removed, deposited or otherwise treated "in group" when all the articles of the plurality are moved, removed, deposited, or otherwise treated, in the same time interval or, in other words, simultaneously.

For example, the articles are rotated "in groups" when they all begin and end a rotation movement at substantially the same instant.

The term "container" means any receptacle that is suitable for containing articles, in particular any receptacle in which the transfer device deposits the articles removed. Preferably the tray is a receptacle suitable for packaging a plurality of discrete rows of articles.

It is also specified that the expression "moving an object between a first position and a second position" means both the movement from the first position to the second position and the movement from the second position to the first position.

This definition applies equally to similar expressions of movement, such as for example transferring or moving a generic object between two positions or between two zones or even between two different operating configurations.

The Applicant, in the context of the constant need to increase the performance and efficiency of production lines, has preliminarily observed that, in a line for the packaging of articles, the speed at which the articles are fed into the packaging machine, for example with respect to the placing of the articles on a conveyor device, can constitute an important element of limitation of the production capacity of the line itself.

This limitation is even more critical if the packaging machine is configured to operate with articles grouped in discrete rows that are transported along the packaging line by means of the conveyor device. In particular, the Applicant has noted that the feeding of single discrete rows of articles requires an individual movement of each row. This leads to a high degree of operational complexity, making it necessary in some areas to carry out manual activities in the steps of loading the articles.

In order to increase the feeding speed of the feeding groups, the Applicant has therefore perceived that this could be achieved by collecting the articles in a plurality of discrete rows prior to their feeding into the packaging line.

In the light of this initial insight, the Applicant has then observed that, in some known feeding groups, articles are taken from special containers to be placed manually, in discrete rows, on the conveyor devices of the packaging line.

The Applicant has also noted that in the step of moving the articles between the containers and the packaging line, the empty container must be properly managed, either by providing for the replacement thereof by a new container containing additional articles or by replenishing the container with new articles once it has been emptied. Thus, the Applicant has further perceived that the feeding of articles into the production line can be improved by placing the articles arranged in a plurality of discrete rows in trays and providing for an appropriate movement of such trays between different stations.

Finally, the Applicant has found that by providing a retaining device configured to retain the tray during the movement between different stations of the feeding group and configured to release, when necessary, the tray, it is possible to properly manage the movement of the trays, by unloading the discrete rows, initially arranged in the tray, onto a conveyor device, and placing the tray, once emptied, back into an appropriate station.

Thanks to these features, the feeding group can feed, through a single movement, a plurality of discrete rows of articles at the same time instead of feeding each row individually.

In a first aspect thereof, therefore, the present invention is directed to a feeding group for feeding a plurality of articles in discrete rows.

Preferably, the feeding group comprises a tray which is configured to contain articles arranged in a plurality of discrete rows.

Preferably, the feeding group comprises an inlet station which is configured to receive said tray containing the plurality of articles which are arranged in said plurality of discrete rows.

Preferably, the feeding group comprises a transfer device which is configured to move the tray between an inlet station, an unloading station and an outlet station.

Preferably, said transfer device comprises a retaining device which is configured to retain the tray during the movement of the tray between the inlet station and the unloading station.

Preferably, said retaining device is further configured to release the tray at the outlet station.

Preferably, the feeding group further comprises an unloading device configured to unload articles from said tray at said unloading station.

Preferably said unloading station comprises a conveyor device which is configured to receive the plurality of discrete rows which are unloaded from the tray.

Thanks to these characteristics, the feeding group allows a plurality of articles, already arranged in discrete rows, to be fed by moving a tray on which these rows are arranged, thus avoiding the movement of single rows or articles. The ability to release the tray at an outlet station allows carrying out a cyclic movement, further contributing to faster feeding operations. The feeding group can therefore be used effectively in industrial lines where high production capacity and high efficiency are required.

The Applicant also believes that the feeding of articles into the production line by means of the tray movement provided for by the above described feeding group is faster than the known solutions.

In a second aspect thereof, the present invention relates to an article packaging machine, comprising at least one feeding group constructed according to the first aspect and provided to transport discrete rows of articles by means of the conveyor device to further article processing and packaging stations.

The packaging machine according to the invention may advantageously have very high production capacities, limiting the manual activity that may be required during the feeding of the articles or step of pre-sorting of the articles.

In a third aspect thereof, the present invention relates to a method for feeding a plurality of articles in discrete rows in a packaging machine.

Preferably, the method comprises grouping a plurality of articles according to a plurality of discrete rows.

Preferably, the method comprises arranging the plurality of discrete rows of articles in a tray.

Preferably, the method comprises moving the tray towards a station for unloading the discrete rows of articles retaining in said tray the plurality of discrete rows of articles contained therein.

Preferably, the method comprises positioning the tray at said unloading station.

Preferably, the method comprises releasing, after the tray has been positioned at said unloading station, the plurality of discrete rows of articles.

Preferably, the method comprises transferring the plurality of discrete rows of articles to a conveyor device of the unloading station while maintaining the grouping of articles in discrete rows.

Preferably, the method comprises transferring the tray, after the plurality of discrete rows have been transferred to the conveyor device, to an outlet station.

In a fourth aspect thereof, the present invention relates to a feeding group for feeding a plurality of articles in discrete rows.

Preferably, the feeding group comprises an inlet station which is configured to receive a tray containing the plurality of articles arranged in a plurality of discrete rows.

Preferably, the feeding group comprises a transfer device which is configured to move the tray between the inlet station and an unloading station.

Preferably, the feeding group comprises an unloading device which is configured to unload articles from said tray at said unloading station, wherein said unloading device comprises a device for inverting said tray.

Preferably, the feeding group comprises a conveyor device which is configured to receive the plurality of files unloaded from the tray.

Thanks to these features, the feeding group makes it possible to advantageously unload from a tray articles arranged in a number of discrete rows by falling as a result of gravitational force. In this way, the unloading of the articles onto the transfer device can take place with a solution that is constructively simple and still able to guarantee the high production capacity and efficiency required.

The present invention, in at least one of the aforesaid aspects, may have at least one of the further preferred features set out below.

In preferred embodiments, said transfer device comprises an inverting device for said tray.

In this way, the articles contained in the tray can be removed by inverting the tray, simplifying unloading operations.

Preferably, said inverting device is configured to rotate said tray about an inverting axis transverse to a vertical axis. Preferably, said inverting axis is essentially horizontal.

It will be appreciated that these features both contribute to making appropriate use of the action of gravitational force in order to achieve the fall of the articles in the tray. In some embodiments, said inverting device comprises a rotating support, which is rotatable about said inverting axis and which can be linearly moved in translation along said inverting axis.

Thanks to this feature, it is possible to realise the inverting device by means of a particularly simple construction solution that allows, at the same time, high movement speeds and therefore productivity.

Preferably, said retaining device is connected to said inverting device.

In this way the retaining device can advantageously act, by retaining and, when necessary, releasing the tray during the movement thereof.

Preferably, said retaining device is connected to said rotating support. This characteristic makes it possible to obtain a solution that is particularly robust and therefore suitable for operating in a cyclic manner and at high speed, as typically required in packaging lines.

In preferred embodiments, said retaining device comprises movable arms which are configured to retain said tray on opposite sides. In this way, the tray can be retained and released by means of a not excessive excursion of the arms, resulting in a solution that requires small dimensions and therefore lends itself particularly well to movement. Preferably, said movable arms and said opposite sides of said tray comprise respective coupling elements which comprise a male element and a female element which are formed on said tray and on said movable arms, respectively, or vice versa, and which are capable of mutual engagement.

It will be appreciated that this feature allows the tray to be retained sufficiently stably on the retaining device, without the need to use specific hooking systems.

Preferably, said female element comprises a U-shaped or V-shaped profile, and said male element comprises a flat element which is engageable in said U-shaped or V-shaped profile.

In this way the tray can be retained by limiting or preventing the translation within the female element and, at the same time, the mutual engagement between tray and arms can take place simply by translation through approach of the latter.

In some embodiments, said retaining device comprises support rods connected to said rotating support and to which said movable arms are translatably connected.

This feature also contributes to realising a structure that is particularly strong and suitable for the movement during the article feeding.

Preferably, said movable arms are translatable with respect to said support rods in a direction substantially parallel to said inverting axis. In this way, a firm retention on the tray can be guaranteed by the movable arms, which will react against the support rods when they close on a tray.

Preferably, each of said movable arms is connected to a corresponding support rod by a pair of connecting rods, said connecting rods being configured in such a way as to form, together with the respective movable arm and rod, a quadrilateral mechanism.

This feature allows obtaining an effective movement of the arms by means of a simple, strong mechanical system that ensures sufficient stability to the retention of the tray. In preferred embodiments, said unloading device comprises at least one selectively movable wall which can be positioned in a first operating position in which it faces said tray and retains said discrete rows of articles in said tray and a second operating position in which it is moved away from said tray and said discrete rows of articles are freely accessible inside said tray.

This makes it possible to close the tray when the discrete rows of articles are placed therein and to open it when unloading takes place.

Preferably, said movable wall is movable between said first and said second operating position by lateral translation.

In some embodiments, the tray defines a rest plane for the discrete rows of articles.

Preferably, the lateral translation of the movable wall takes place along a plane substantially parallel to the rest plane defined by the tray.

These features allow reducing the space required for the movable wall to move away from the tray, making the discrete rows of articles free to leave the tray or, more generally, are freely accessible.

Preferably, said movable wall is supported on said transfer device.

In some embodiments, said unloading device comprises a plurality of movable walls.

Preferably, said unloading device comprises a pair of movable walls susceptible to movement of mutual approach and distancing in such a way as to move between said first and said second operating positions.

Thanks to these features, it is possible to realise a structure that is able to release the articles on the tray quickly and allows it to be moved quickly together with the transfer device and the tray it retains.

Preferably, said retaining device, said tray and said movable wall are configured such that when the wall is in its first operating position, each discrete row of articles arranged in the tray is at a distance from said movable wall less than the depth of said depressions. This prevents or significantly prevents articles from accidentally falling out of the tray during the inverting movement.

In preferred embodiments, said conveyor device defines an advance direction, said advance direction being substantially parallel to said inverting axis.

This allows optimising the overall dimensions of the feeding group by defining a space next to the conveyor device for the inlet and outlet stations.

Preferably, said inlet station and said outlet station are aligned along said inverting axis. Preferably, said unloading station is placed axially opposite to said inlet station and/or said outlet station with respect to said inverting axis.

These features also help to optimise the overall dimensions and allow the transfer device to reach the different stations with simple movements.

Preferably, the feeding group comprises a tray configured to contain articles arranged in a plurality of discrete rows.

In some embodiments, said tray comprises a plurality of depressions separated by a relative projection, said depressions being configured to accommodate a respective discrete row of articles.

This feature makes the trays easily stackable.

Preferably, said tray comprises side edges parallel to said depressions.

Preferably, in said tray one of said depressions is arranged adjacent to one of said side edges and one of said projections is arranged adjacent to the other side edge.

In preferred embodiments, said tray is axially symmetrical with respect to an axis of symmetry perpendicular to said depressions.

In this way, the trays can be stacked one on top of the other when containing articles arranged in discrete rows, optimising the space requirements while keeping the side edges aligned. In fact, each tray can be stacked on top of another rotated by 180° around a vertical axis. The discrete rows of articles in a tray will therefore be staggered from the rows of the tray stacked on top of it. Therefore, it will be possible to use the space defined by each projection separating the recesses to accommodate the discrete row of articles in the underlying tray. As a result, the vertical dimensions of a series of stacked trays can be advantageously reduced, while having the side edges of all the trays forming the stack aligned along the same line. In addition, each tray rests on the projections of the underlying tray it, thus preserving the articles that are not burdened by the weight of the upper trays.

Preferably, said outlet station is configured to rotate about a substantially vertical axis. Preferably, said outlet station is configured to carry out a rotation of 180° about said substantially vertical axis after the release of said tray at said outlet station.

This allows empty trays to be stacked as compactly as possible, while still using the alternating arrangement described above for the trays containing the articles arranged in discrete rows.

In some embodiments, said outlet station is configured to support a plurality of trays and can be moved in translation in a vertical direction so as to be lowered with respect to an initial position according to the total number of trays supported.

Preferably, said inlet station is configured to support a plurality of trays and can be moved in translation in a vertical direction so as to be lifted with respect to an initial position according to the total number of trays supported.

Thanks to these features, an alignment can be maintained between the retaining device and the inlet and/or outlet stations without requiring any movement capacity of the movement device in the vertical direction.

Preferably, said conveyor device comprises a plurality of support elements which are configured to retain a discrete row of articles.

In this way, each discrete row contained in the tray can be received in a corresponding support element, following unloading.

In preferred embodiments, said support elements comprise lateral walls apt to retain a discrete row, said lateral walls defining a longitudinal direction of said support elements, the unloading device being configured to unload said discrete rows of articles parallel to said longitudinal direction of said support elements.

This feature simplifies the transfer of the discrete rows of articles from the tray to the conveyor device, allowing them, for example, to be positioned on the support elements by falling as a result of gravitational force fall.

Preferably, said support elements have an open end at opposite ends defined by said lateral walls, said open end being configured to allow the passage of the discrete row supported in the support element by sliding in said longitudinal direction.

In this way, each row can be removed from the support element by means of a pushing action in the longitudinal direction of the row, causing it to slide out of the support element and be directed towards further stations of the packaging machine.

Preferably, said support elements define a respective seat for housing of one of said discrete rows.

In some embodiments, support elements comprise a base wall configured so as to receive in a supporting manner one of said discrete rows.

Preferably, said seat is defined by said base wall and said lateral walls.

In preferred embodiments, said support elements are oriented transversely to said advance direction. Preferably, said support elements are oriented substantially perpendicular to said advance direction.

This orientation of the transport elements makes it possible both to optimise the overall dimensions of the discrete rows on the transport device and to facilitate the possibility of transferring the rows outside the support elements by pushing, as described above. Preferably, the plurality of discrete rows of articles is transferred to the conveyor device of the unloading station while maintaining the grouping of articles in discrete rows present in the tray.

In this way, feeding operations can be speeded up and rationalised, as it is possible to prepare the discrete rows on the tray at an earlier stage and carry out loading without having to act individually on the loose articles.

In some embodiments, the positioning of the tray at said unloading station comprises rotating said tray around an inverting axis. Preferably, said inverting axis is transverse relative to a vertical axis.

These features also contribute to making the most of the action of gravitational force in order to achieve the fall of the articles that are present in the tray.

Preferably, positioning the tray at said unloading station comprises moving the tray linearly in translation along said inverting axis.

In this way, only linear actuators can be used for the movement, ensuring simplicity and reliability of the structure.

In preferred embodiments, said tray is retained by grasping opposite sides of the tray. Thanks to this feature, the tray can be retained without requiring elements that prevent access to the discrete rows it contains.

Preferably, the plurality of discrete rows of articles are transferred to the conveyor device of the unloading station by falling as a result of gravitational force.

It will be appreciated that in this way the transfer of discrete rows between the tray and the conveyor device can be carried out without requiring any additional device.

Preferably, the fall by gravitational force is prevented during the movement of the tray by means of a movable wall facing the tray. Preferably, the movable wall is moved away from the tray to allow the discrete rows of articles to fall.

Thanks to the movable wall, the risk of articles falling from the tray during movement is eliminated or significantly reduced.

The characteristics and advantages of the invention will become clearer from the detailed description below of an embodiment illustrated, by way of non-limiting example, with reference to the appended drawings wherein.

Figure 1:
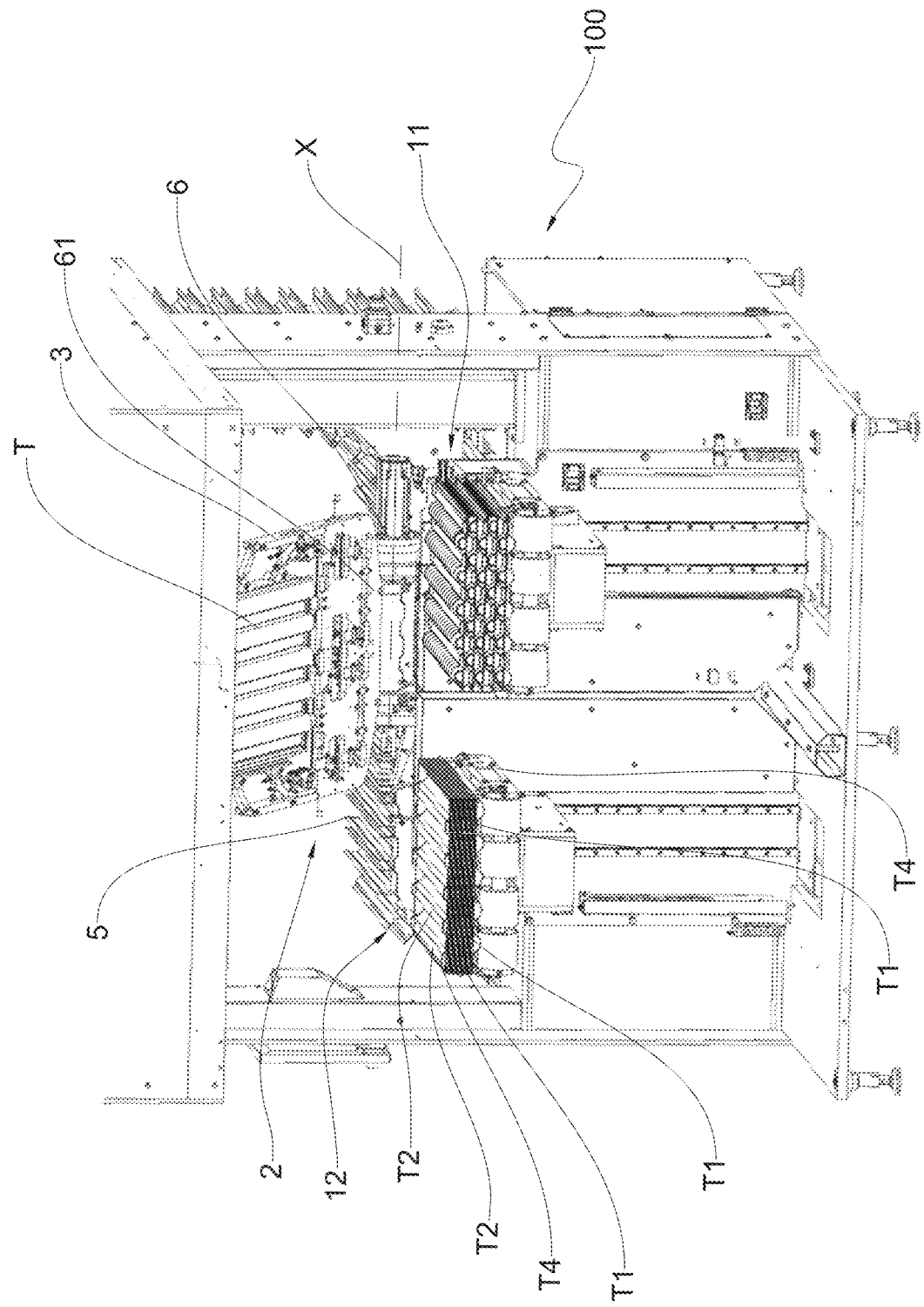
FIG. 1 is a schematic view in side perspective of a feeding group made in accordance with the present invention.

With reference initially to FIG. 1, 100 is collectively referred to as a feeding group for a packaging machine made in accordance with the present invention.

The packaging machine, not shown in the figure, may for example be of a type suitable for packaging coffee in capsules. It will therefore be appreciated that, in this example, the articles I correspond to the capsules and, the feeding group can be used to feed empty capsules, prior to filling and closing them.

However, the feeding group 100 of the present application may also find application in different packaging areas and the articles fed therefrom may include a variety of products, as illustrated above.

As is visible in the example embodiment of FIG. 1, in preferred embodiments, the feeding group 100 comprises a conveyor device 5 which is configured to advance the articles I, preferably grouped into discrete rows L, towards one or more processing and/or packaging stations, not illustrated in the Figure, of the packaging machine.

Preferably, the conveyor device 5 comprises a plurality of support elements 51, illustrated in greater detail below, capable of advancing along an advance direction A, for example by means of a catenary system 56, schematically illustrated in FIG. 6.

With reference again to FIG. 1, the articles I are fed into the feeding group 100 arranged in a tray T, in which a plurality of discrete rows L of said articles I may be located.

The tray T or, preferably, a plurality of overlapping trays T, is initially located at an inlet station 11 which is configured to receive said tray T containing the plurality of articles I.

Figure 4:
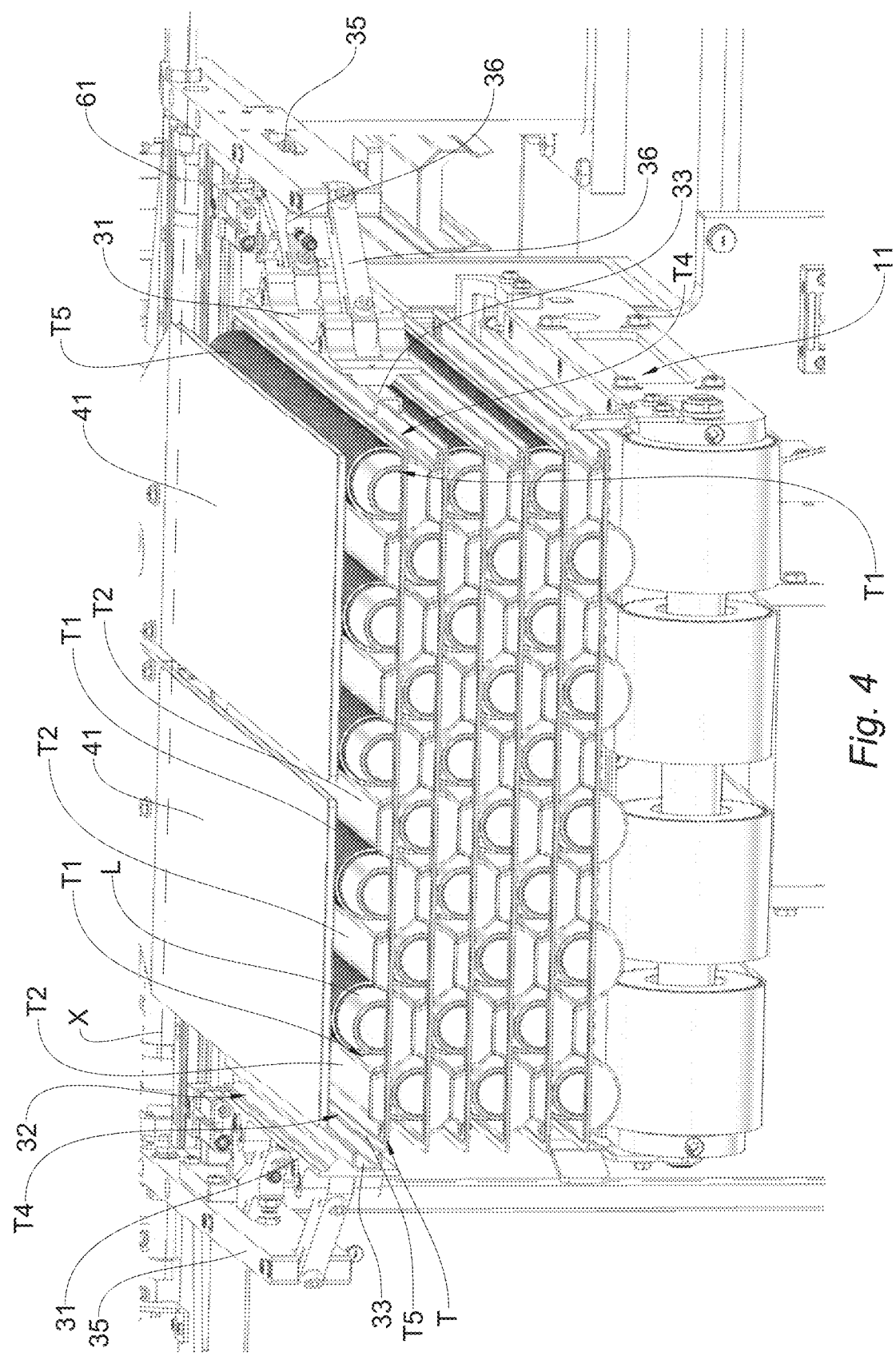
FIG. 4 is a schematic view, in detail, of the feeding group in FIG. 1 illustrating a tray retaining device, in a step of approach to the tray.

As better shown in FIG. 4, in some embodiments the trays T comprise a plurality of depressions T1 which are separated by a relative projection T2. The depressions are configured to receive a respective discrete row L of articles I and define a relative housing seat. Preferably, the projection T2 defines an underlying space which, as will be seen below, is advantageously suitable to receive a portion of the discrete row of articles I of the underlying tray.

As can be observed in the Figure, the trays T can be advantageously stacked staggered, so that the depression of one tray is superimposed on the projection of the tray superimposed thereon. In this way, the space defined below the projection T2 is used to receive the portion of the discrete row of articles I of the underlying tray, as previously mentioned.

It will also be appreciated that in tray T side edges T4 are defined as parallel to depressions T1. In some embodiments, the tray T comprises an end projection T3 separating a depression of said plurality of depressions T1 adjacent to one of said side edges T4. The other side edge T4 is directly adjacent to a depression T1.

As visible in the Figure, thanks to this formation it is possible to stack the trays that are aligned along the side edges T4, by staggering the depressions between two adjacent trays and, consequently, the position of the discrete rows L of articles I.

In preferred embodiments, the tray T is also axially symmetrical with respect to an axis of symmetry perpendicular to the depressions T1. Consequently, by rotating the tray by 180°, the alignment of depressions and projections can be achieved again.

With reference again to FIG. 1, the feeding group further comprises a transfer device 2 which is configured to move the tray T between an inlet station 11, an unloading station 12 and an outlet station 13.

As will be illustrated in greater detail below with reference to preferred forms of embodiment, in the unloading station 12 the discrete rows L of articles I are advantageously unloaded onto support elements 51 of the conveyor device 5 in order to be transported to the other stations of the packaging machine.

On the other hand, the outlet station 13 is advantageously provided to receive T the trays, once the rows L of articles I have been unloaded.

The outlet station 13 can therefore be a storage station, in which the empty trays are stowed.

At the outlet station 13 the trays can be positioned in such a way that, when stacked, the depressions and projections of one tray are aligned with those of the underlying tray. This allows more trays to be grouped at the outlet station, optimising the overall stack dimensions.

In order to achieve the positioning described above, the outlet station 13 is in some embodiments configured to rotate about a substantially vertical axis. Preferably, the outlet station 13 rotates 180° around the substantially vertical axis after each tray T has been released at the outlet station 13. In this way, when the next tray is placed, which in the inlet station was staggered with respect to the other tray, the depressions and the projections of the trays can be aligned.

In some embodiments, the outlet station 13 can also be moved in translation in a vertical direction so as to be lowered from an initial position according to the total number of trays supported. In other words, as the trays are placed on the outlet station 13, the station will be lowered so that the last tray stacked is essentially always at the same distance from the ground or other reference surface.

Preferably, the same feature can also be applied to inlet station 11.

In fact, it will be appreciated that in some embodiments, in which the outlet station 13 may also present different characteristics with respect to the aforesaid, the inlet station 11 can be moved in translation in a vertical direction in such so as to be lifted with respect to an initial position according to the total number of trays supported. In other words, as the trays are removed from the inlet station 11, the station will be lifted in such a way as to keep the first useful tray in the stack essentially always at the same distance from the ground or other reference surface.

Figure 2:
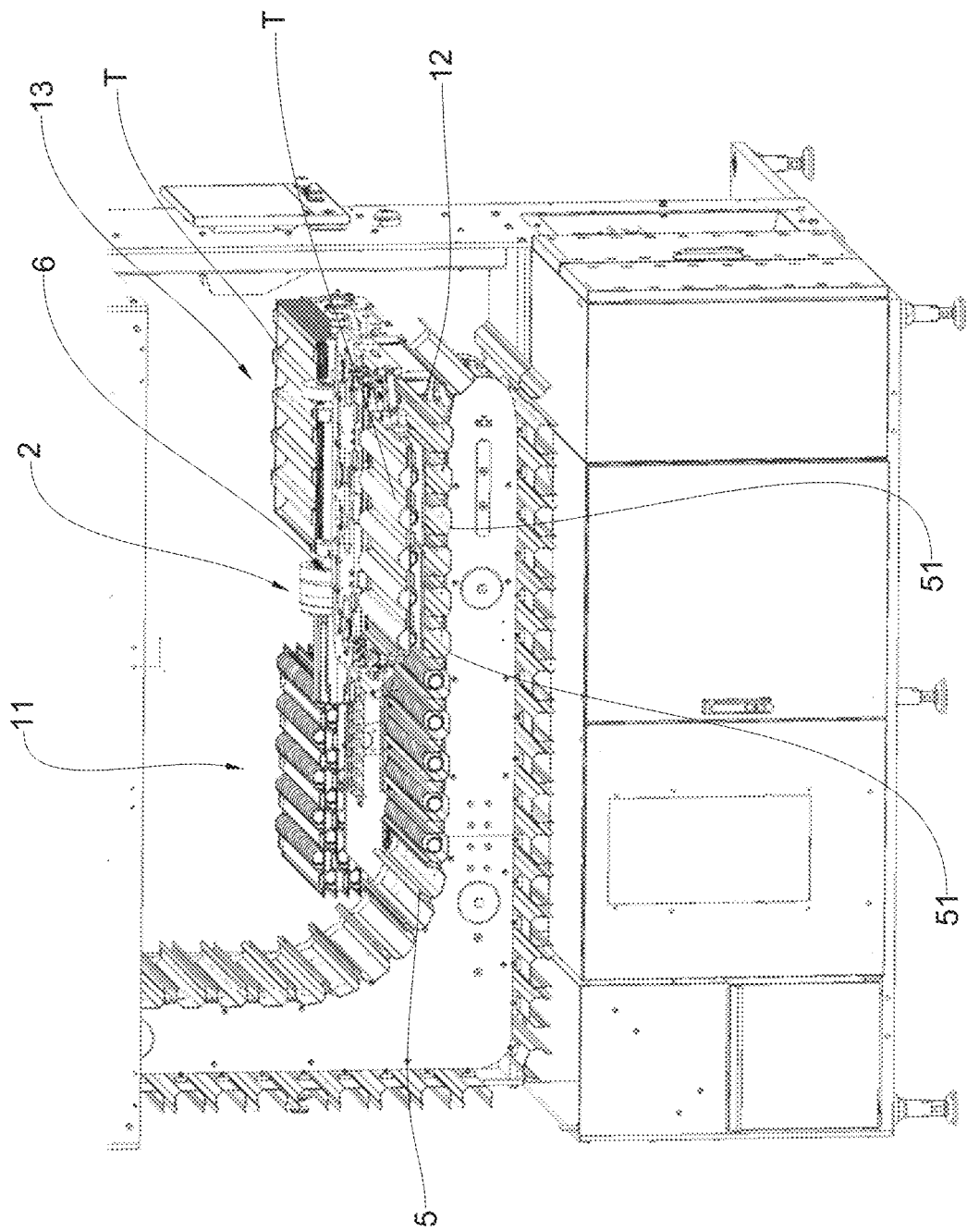
FIG. 2 is a schematic view of the feeding group of FIG. 1, from a different side perspective, during an operation to unload the plurality of discrete rows of articles from the tray.
Figure 3:
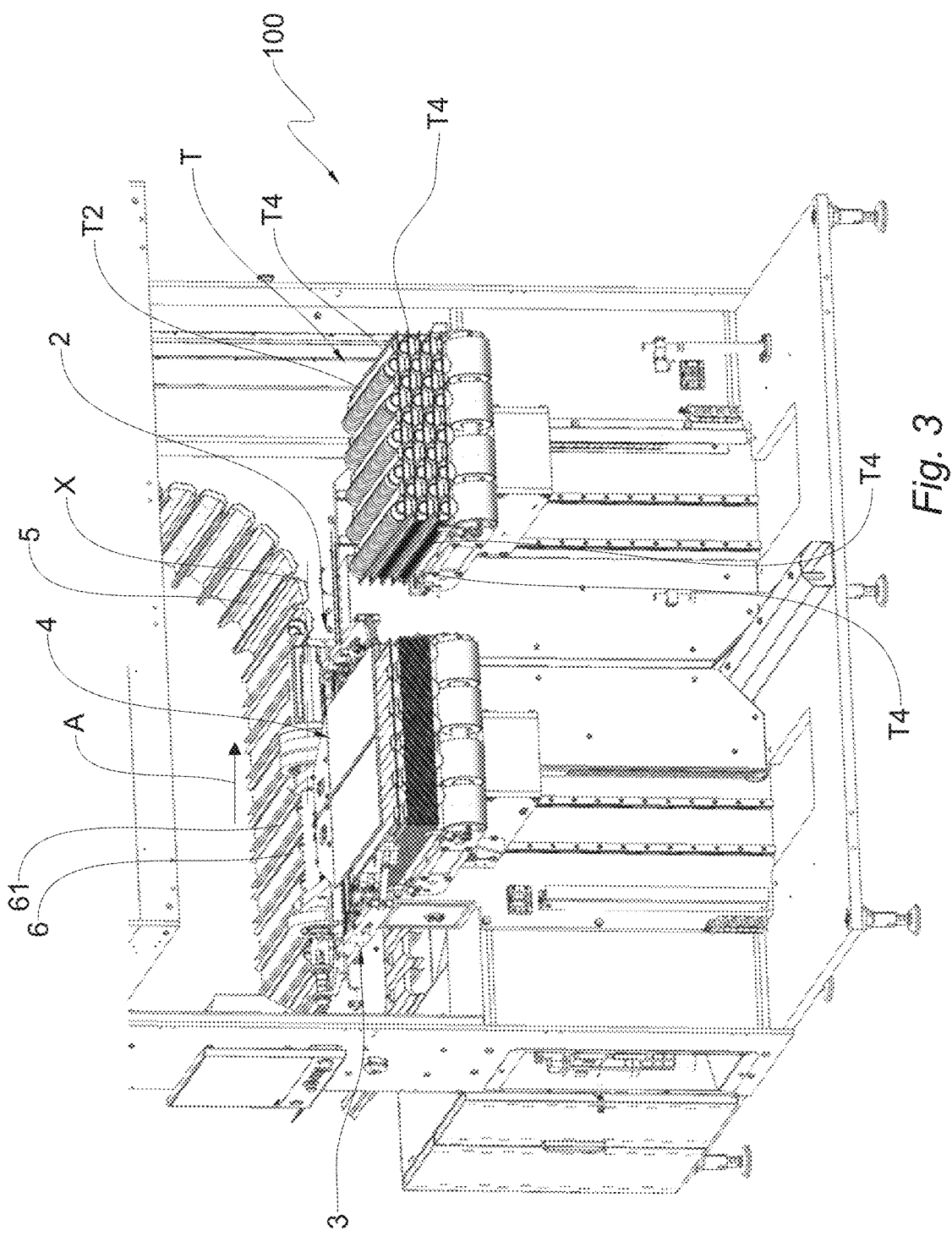
FIG. 3 is a schematic view in side perspective of the feeding group of FIG. 1 in a different operating position.

The movement of the tray T between the inlet station 11, the unloading station 12 and the outlet station 13 by means of the transfer device 2 is schematically represented, in some movement steps, in FIGS. 1 to 3.

The transfer device 2 is preferably initially placed at the inlet station 11 where it can collect and retain a tray T containing a plurality of discrete rows L of articles I.

Subsequently, as shown in FIG. 1, the transfer device 2, together with the tray it retains, is moved and inverted so as to be placed, arranged upturned, at the unloading station 12, where the unloading of the articles I takes place. FIG. 2 shows an embodiment example of the feeding group in this latter operating position.

After unloading, the tray T is again inverted and moved in order to be positioned at the outlet station 13, where the tray T, which is now empty, is released and collected at that station, as for example shown in FIG. 3.

It will be appreciated that in such a handling the translation and inverting movements can take place in any order, i.e. first the translation and then inversion or vice versa, or they can take place entirely or partially simultaneously.

As can be observed from the figures, in order to realise the movement described above, the transfer device 2 advantageously comprises an inverting device 6 of the tray T.

Preferably, the inverting device 6 is configured to rotate the tray T about an inverting axis X transverse relative to a vertical axis. This inverting axis X is preferably substantially horizontal.

In some embodiments, the inverting device 6 comprises a rotating support 61, which is rotatable about said inverting axis X and which can be linearly moved in translation along said inverting axis X.

It will therefore be appreciated that the rotating support advantageously allows the tray T to be inverted and the translation thereof allows the linear movement of the tray.

In some embodiments, the inverting axis also defines the relative position of the inlet 11, unloading 12 and outlet 13 stations.

Preferably, the inlet station 11 and the outlet station 13 are aligned along the inverting axis X. In preferred embodiments, moreover, the unloading station 12 may be placed axially opposite to the inlet station 11 and/or the outlet station 13 with respect to the inverting axis X.

In order to keep the tray T in position during the movement between the stations 11, 12 and 13, the feeding group 100 may advantageously comprise a retaining device 3. Preferably, the retaining device 3 is also configured to release the tray T when necessary, for example at the outlet station 13 as previously illustrated.

Figure 5:
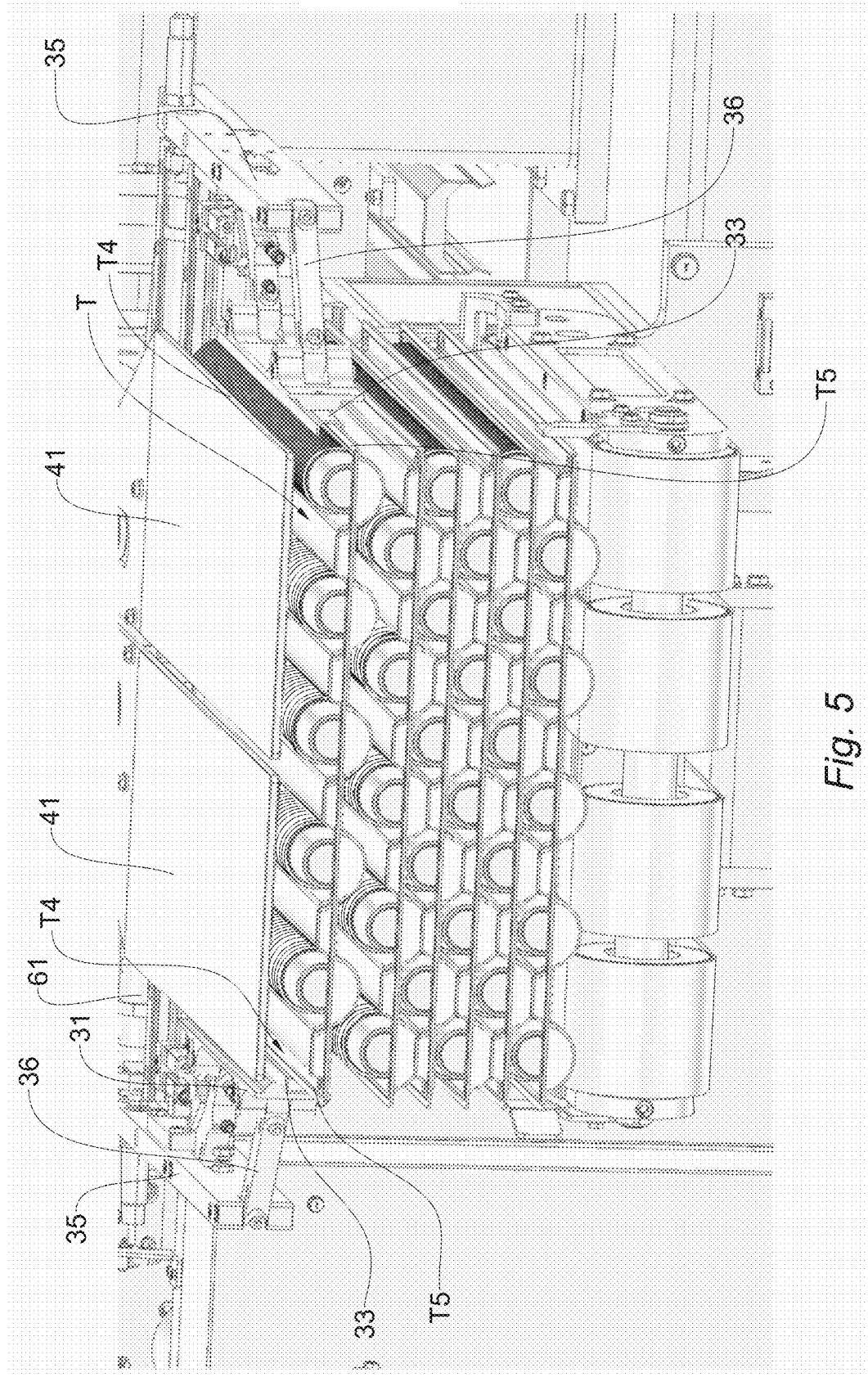
FIG. 5 is a schematic view of the retaining device in FIG. 4 while it is retaining the tray during the movement.

The retaining device 3 is illustrated, in detail, in a preferred embodiment thereof, in FIGS. 4 and 5.

Preferably, the retaining device 3 is connected to said inverting device 6.

As can be observed from the figures, in preferred embodiments, the retaining device 3 comprises movable arms 31 which are configured to retain said tray T on opposite sides. These sides may correspond, in some embodiments, to those defined by the edges T4. Preferably, the retention of the tray T may take place by engaging each edge of the tray T by means of a respective coupling element 32.

In some embodiments, the coupling element 32 comprises a U- or V-shaped profile, on which a corresponding flat element may be engaged.

Preferably, the U- or V-profile can be made on or connected to the movable arms 31. The flat element can be placed on the tray T, preferably defined by the edge T4 of the tray itself.

More generally, in preferred embodiments the coupling elements 32 may comprise a male element T5 and a female element 33 which are formed respectively on said tray T and said movable arms 31 or vice versa, and is capable of mutual engagement.

In order to achieve the aforesaid engagement between male and female elements, the movable arms 31 can be advantageously moved towards the tray T.

Accordingly, when the transfer device 2 places the retaining device 3 in such a position that the tray T on top of the stack placed on the inlet station 11 is interposed between the two movable arms 31, the latter can be moved close to each other, thus retaining the tray T.

In some embodiments, the retaining device 3 is connected to the rotating support 61 so as to make it integral with the transfer device 2.

In some embodiments, the retaining device 3 further comprises support rods 35 connected to the rotating support 61 and to which said movable arms 31 are translatably connected. It will be appreciated that, if the support rods 35 are present, the movable arms 31 can perform the aforesaid retaining action by translating with respect to the support rods 35 in a direction substantially parallel to the inverting axis X.

The movable arms 31 are preferably moved by means of a quadrilateral mechanism. In some embodiments, each of the movable arms 31 is connected to a corresponding support rod 35 by a pair of connecting rods 36, which together with the respective movable arm 31 and the respective rod 35 form the quadrilateral mechanism.

In preferred embodiments, the feeding group 100 is configured to retain the discrete rows L of articles I in the tray T during movement of the latter.

In this respect, an unloading device 4 may be provided which is configured to unload the articles I from said tray T at the conveyor device 5 of the unloading station 12.

Figure 6:
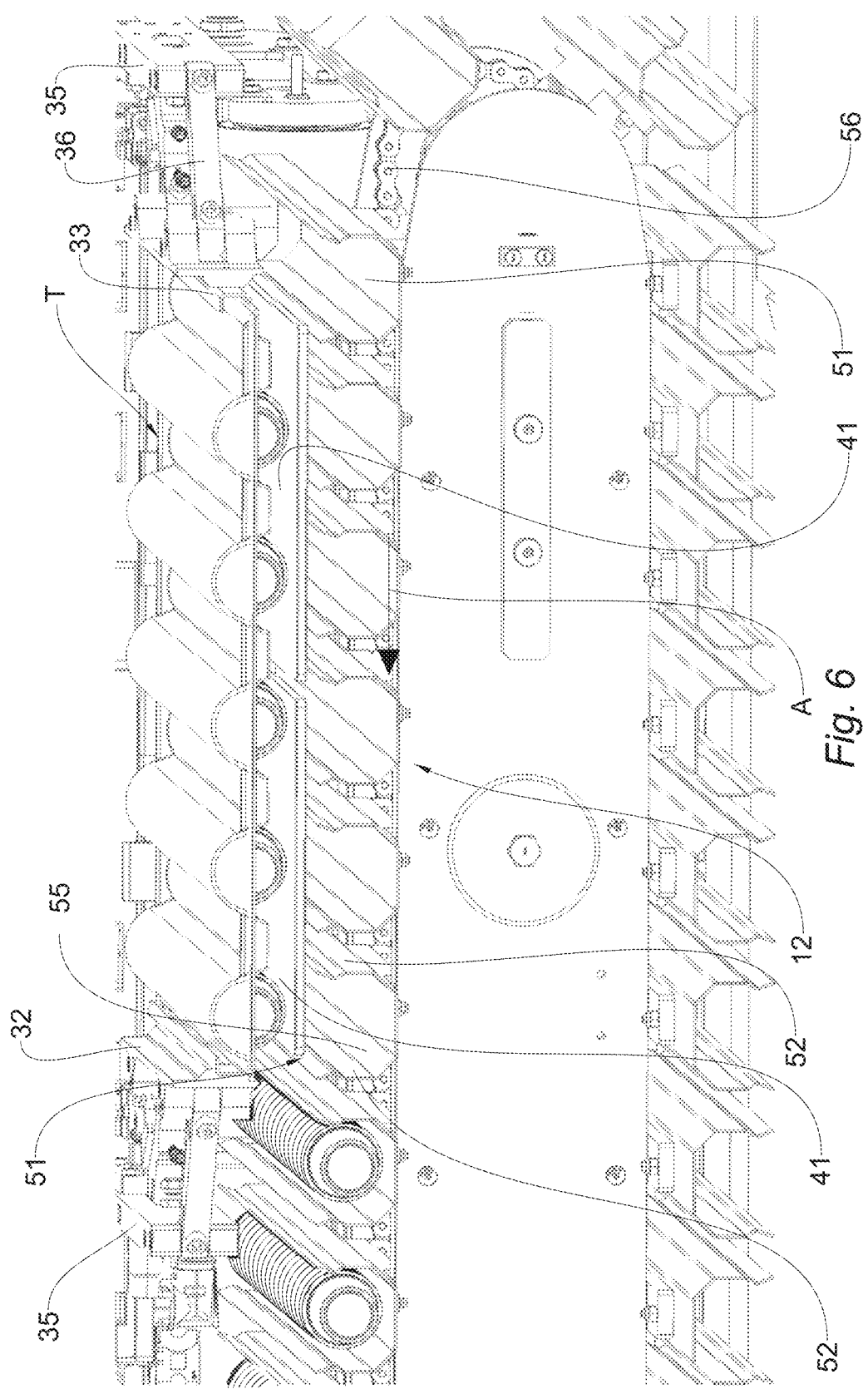
FIG. 6 is a schematic view, in detail, of the feeding group as shown in FIG. 3, during the unloading of the discrete rows of articles onto a conveyor device.
Figure 7:
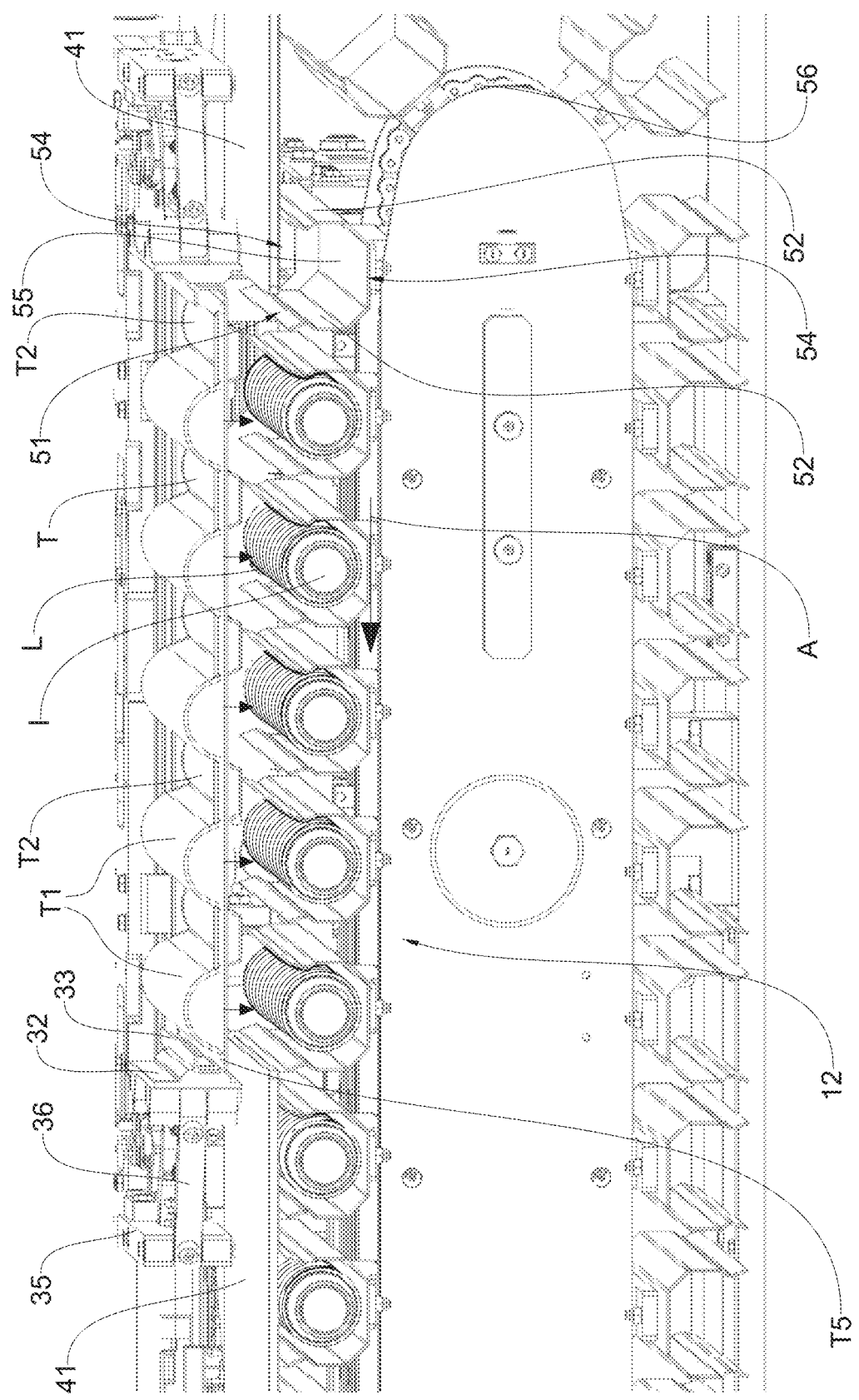
FIG. 7 is a schematic view, in detail, of the feeding group as illustrated in FIG. 3, with the discrete rows of articles unloaded onto the conveyor device.

With reference to FIGS. 5 to 7, in preferred embodiments, the unloading device 4 comprises at least one movable wall 41 which can be positioned selectively in a first operating position, in which it faces said tray T and retains discrete rows L of articles I in said tray T and a second operating position in which it is moved away from the tray T. Preferably, the unloading device comprises two movable walls 41 and, thereafter, the description will refer to the embodiment in which two movable walls 41 are provided, it being understood that the same concepts may also be applied to embodiments in which only one movable wall 41 is provided.

It will also be appreciated that in the second operating position the discrete rows L are free to fall from the tray T, preferably by gravitational force, when it is inverted.

More generally, in the second operating position the discrete rows L of articles I are freely accessible within said tray T. Consequently, as an alternative to the fall by gravitational force, different solutions may also be envisaged for picking up the discrete rows L and releasing them onto the conveyor device 5.

As can be observed from FIGS. 5 and 6, when the tray T is moved between the inlet station 11 and the unloading station 12, in particular during inverting, the movable walls 41 prevent the articles from falling by gravitational force as the movable walls 41 face, and are integral with, the tray T.

In fact, during the movement, the possible action of the gravitational force will bring the articles I to rest on the movable walls 41 preventing them from falling from the tray.

For this purpose, where the tray has the previously described depressions T1, the retaining device 3, the tray T and the movable wall 41 may be configured such that when the wall 41 is in the first operating position, each discrete row L of articles I arranged in the tray is at a distance from the movable wall 41 that is less than the depth of said depressions T1. This prevents the articles from falling completely out of the housing seats defined by the depressions T1.

At the unloading station 12, the movable wall 41 is advantageously moved away from the tray T to allow the discrete rows L of articles I to fall.

In some embodiments, the movable walls 41 are movable between the first and the second operating position by means of lateral translation. Preferably, the movable walls 41 are capable of movement in mutual approach and distancing so that they move between the first and the second operating position.

Preferably, the translation movement of the movable walls 41 occurs along a plane substantially parallel to a plane defined by the tray T itself. The translation of the movable walls 41 may take place by means of a special movement equipment, not illustrated in the Figure, preferably connected to the transfer device 2. More generally, the movable wall 41 can be supported on the transfer device 2.

As previously described, when the tray T is placed at the unloading station 12, the discrete rows L of articles I are preferably aligned with the support elements 51 of the conveyor device 5 that are arranged below, as illustrated in the example embodiment of FIG. 6.

In order to facilitate the maintenance of the same order of the articles I according to the discrete rows L placed in the tray T, the articles I are dropped into the support elements 51 of the conveyor device 5.

In preferred embodiments, the support elements 51 comprise lateral walls 52 apt to retain a discrete row L.

The unloading device 4 is advantageously configured to unload the discrete rows L of articles I parallel to a longitudinal direction of the support elements 51.

This longitudinal direction can be defined by the lateral walls 52. More generally, the support elements 51 may define a respective seat 53 for receiving one of said discrete rows L and defining the longitudinal direction thereof.

In some embodiments, the seat 53 may be defined by a base wall 55, which is configured to receive in a supporting manner one of said discrete rows L, and by the lateral walls 52.

Preferably, the support elements 51 are oriented substantially perpendicular, or more generally transverse, to the advance direction A defined by the conveyor device. In some embodiments, this advance direction A is parallel with the inverting axis X.

Preferably, the support elements 51 have an open end 54 at opposite ends defined by the lateral walls 52. This end 54 advantageously allows the passage of a discrete row L of articles I simply by sliding in the respective longitudinal direction. This feature can be particularly advantageous in the subsequent steps of packaging where, for example, the discrete rows are aligned in a single continuous row.

It goes without saying that a person skilled in the art may, in order to meet specific and contingent application requirements, make further modifications and variants of the above-described invention within the scope of protection as defined by the following claims.

The invention claimed is:

1. A feeding group for feeding articles in discrete rows, said feeding group comprising:
    a tray configured to contain articles arranged in discrete rows;
    an inlet station configured to receive said tray containing the articles arranged in said discrete rows;
    a transfer device configured to move the tray between the inlet station, an unloading station and an outlet station, the transfer device comprising a retaining device configured to retain the tray during movement of the tray between the inlet station and the unloading station, said retaining device being further configured to release the tray at the outlet station, wherein said transfer device comprises an inverting device for said tray, said inverting device being configured to rotate said tray about an inverting axis transverse relative to a vertical axis; and
    an unloading device configured to unload the articles from said tray at said unloading station,
wherein said unloading station comprises a conveyor device configured to receive the discrete rows unloaded from the tray, and
wherein said inlet station and said outlet station are aligned along an axis parallel to said inverting axis, said unloading station being arranged laterally to the inlet station or the outlet station, in a position axially opposite said inlet station and/or said outlet station with respect to said inverting axis.

2. The feeding group according to claim 1, wherein said inverting device comprises a rotary support rotatable about said inverting axis and linearly moveable in translation along said inverting axis.

3. The feeding group according to claim 1, wherein said retaining device is connected to said inverting device.

4. The feeding group according to claim 1, wherein said conveyor device defines an advance direction substantially parallel with said inverting axis.

5. The feeding group according to claim 1, wherein:
    said retaining device comprises movable arms configured to retain said tray at opposite sides; and
    said movable arms and said opposite sides of said tray comprise respective coupling elements comprising in turn a male element and a female element formed on said tray and on said movable arms, and capable of mutual engagement.

6. The feeding group according to claim 1, wherein said unloading device comprises at least one movable wall selectively positionable in
    a first operating position, where the at least one movable wall faces said tray and retains said discrete rows of articles in said tray, and
    a second operating position, where the at least one movable wall is moved away from said tray and said discrete rows of articles are freely accessible inside said tray.

7. The feeding group according to claim 6, wherein said unloading device comprises a pair of movable walls capable of moving towards and away from each other between said first operating position and said second operating position.

8. The feeding group according to claim 1, wherein:
    said tray comprises depressions separated by a relative projection, said depressions being configured to receive a respective discrete row of articles; and
    said tray is axially symmetrical with respect to an axis of symmetry perpendicular to said depressions.

9. The feeding group according to claim 8, wherein
    said unloading device comprises at least one movable wall selectively positionable in
        a first operating position, where the at least one movable wall faces said tray and retains said discrete rows of articles in said tray, and
        a second operating position, where the at least one movable wall is moved away from said tray and said discrete rows of articles are freely accessible inside said tray, and
    said retaining device, said tray and said movable wall are configured so that, when the at least one movable wall is in the first operating position, each discrete row of articles arranged in the tray is at a distance from said at least one movable wall less than a depth of said depressions.

10. The feeding group according to claim 1, wherein said outlet station is configured to rotate about a substantially vertical axis, said outlet station being configured to carry out a rotation of 180° about said substantially vertical axis after the release of said tray at said outlet station.

11. The feeding group according to claim 1, wherein said outlet station is configured to support a plurality of trays and is movable in translation in a vertical direction to be lowered with respect to an initial position according to a total number of trays supported.

12. The feeding group according to claim 1, wherein said inlet station is configured to support a plurality of trays and is movable in translation in a vertical direction to be lifted with respect to an initial position according to a total number of trays supported.

13. The feeding group according to claim 1, wherein:
   said conveyor device comprises support elements configured to retain respective discrete rows of articles;
   said support elements define a respective seat for receiving one of said discrete rows, said support elements comprising a base wall configured to receive in a supporting manner one of said discrete rows, and
   said seat is defined by said base wall and by lateral walls.

14. An article packaging machine comprising at least one feeding group according to claim 1, the at least one feeding group being configured to transport discrete rows of articles by the conveyor device of said at least one feeding group to other article processing and packaging stations.

15. A method for feeding articles in discrete rows in a packaging machine, comprising:
   grouping articles according to discrete rows;
   arranging the discrete rows of articles in a tray;
   moving the tray towards an unloading station for the discrete rows of articles, retaining in said tray the discrete rows of articles contained therein;
   positioning the tray at said unloading station;
   releasing, after the tray has been positioned at said unloading station, the discrete rows of articles;
   transferring the discrete rows of articles to a conveyor device of the unloading station, while maintaining a grouping of the articles in discrete rows; and
   transferring the tray, after the discrete rows have been transferred to the conveyor device, to an outlet station;
   wherein positioning the tray at said unloading station comprises moving the tray linearly in translation along said inverting axis.

16. The method according to claim 15, wherein the positioning the tray at said unloading station comprises rotating said tray about an inverting axis, said inverting axis being transverse relative to a vertical axis.

17. The method according to claim 15, wherein:
   the discrete rows of articles are transferred to the conveyor device of the unloading station by falling as a result of gravitational force; and
   falling as a result of gravitational force is prevented, during movement of the tray, by a movable wall facing the tray, the movable wall being moved away from the tray to allow the discrete rows of articles to fall.

* * * * *